(No Model.)

W. LYMAN.
WIND GAGE SIGHT.

No. 514,562. Patented Feb. 13, 1894.

Witnesses
Linus Barnes.
Edwin B. Beckwith

Inventor
William Lyman
By
George L. Barnes Attorney

THE NATIONAL LITHOGRAPHING COMPANY,
WASHINGTON, D. C.

UNITED STATES PATENT OFFICE.

WILLIAM LYMAN, OF MIDDLEFIELD, CONNECTICUT.

WIND-GAGE SIGHT.

SPECIFICATION forming part of Letters Patent No. 514,562, dated February 13, 1894.

Application filed November 4, 1893. Serial No. 490,047. (No model.)

*To all whom it may concern:*

Be it known that I, WILLIAM LYMAN, a citizen of the United States, residing at Middlefield, in the township of Middlefield and county of Middlesex, in the State of Connecticut, have invented certain new and useful Improvements in Wind-Gage Sights for Firearms, of which the following is a specification.

The object of my invention is to provide a wind gage sight for firearms, adapted to be readily adjusted laterally, and applicable to the forward or muzzle end of the arm.

The invention consists in the novel construction, arrangement and combination of parts as hereinafter more fully described and claimed.

Figure 1:
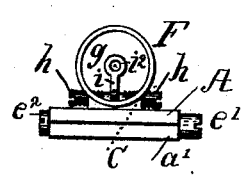
Figure 4:
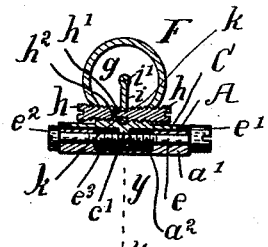
Figure 2:
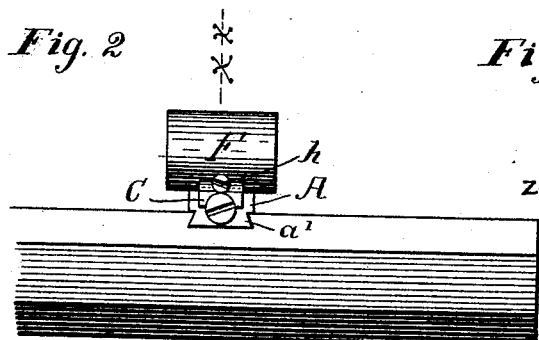
Figure 5:
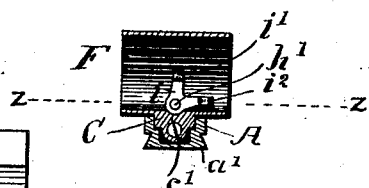
Figure 3:
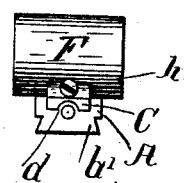
Figure 6:
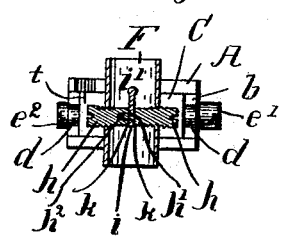
Figure 7:
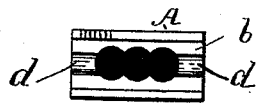

In the accompanying drawings forming a part of this specification, Figure 1 is an end view of my improved sight, and Fig. 2 is a side elevation of the same shown mounted upon a gun barrel. Fig. 3 is a side elevation with the adjusting screw removed. Fig. 4 is a central cross section on the line $x\ x$ Fig. 2. Fig. 5 is a central longitudinal section on the line $y\ y$ Fig. 4. Fig. 6 is a horizontal section on the line $z\ z$ Fig. 5. Fig. 7 is a plan view of the base plate.

Referring to the drawings, A designates the base plate of my improved wind gage sight, which is provided with the part $a'$ of dovetailed form, adapted to fit in a suitable transverse dovetailed slot in the rifle barrel, as shown in Fig. 2. Said base plate has a lengthwise slot $b$ which receives the sliding head C, and bearings $d$ are provided at the ends of the plate centrally of the slot in which an adjusting screw $e$ is journaled, the screw being held in place lengthwise by its head $e'$, and a nut $e^2$ screwed on the end thereof. The middle portion $e^3$ of the screw arbor is threaded and fitted in a nut block $c'$ formed integral with the head C, the base plate being formed with a suitable recess $a^2$ to permit the movement of the nut block and head therein, as the adjusting screw is turned in the nut block. Said movement of the head C, will be transversely to the axis of the barrel, and in operation the movement of the head is therefore adapted to adjust a sight carried thereon, for the "wind gage" or deflection of the line of sight from the line of the target, to compensate for the effect of the wind on the projectile. The head has a suitable index, $t$, and the base plate is graduated, as shown in Figs. 6 and 7 to designate the amount of lateral adjustment of the head in the base plate.

Mounted on the head C, is a tube F, having its axis parallel with the axis of the gun barrel, and adapted to show to the eye in sighting, as a dark ring or annulus inclosing a field $g$. Midway of its length at a point near its junction with the head, the tube is perforated transversely and threaded to receive the screws $h$, which enter into the field of the tube, as shown, and are in alignment with each other. One of the screws is provided with a "teat" $h'$ at its inner end, and the other is formed with a cavity or socket $h^2$ adapted to receive the "teat" of the opposite screw, as shown in Figs. 4 and 6. The "teat" forms a pivot for the sights $i'$ and $i^2$, which are formed integral on an elbow shaped part or folding piece $i$, one being a simple bead, and the other a small ring, or any other combination of sighting devices desired. The elbow shaped part $i$ is adapted in operation to swivel on the "teat" $h'$, to throw either of the sights $i'$ or $i^2$ in sighting position, as shown in Figs. 1 and 5. The shoulders $k$ formed by the ends of the screws exterior to the teat impose sufficient friction on the part $i$ to hold it in any position, and the sights may thus be changed at pleasure, and will remain in any position where set.

The screws $h$ are adapted to serve the purpose of a wind gage alone where required, as by backing one screw and advancing the other, the sights will be carried laterally from the central plane of the tube F, it only being necessary to make the teat $h'$ sufficiently long to permit the separation of the screws in their individual adjustment. But when such result is not required, the teat may be much shorter, and the socket $h^2$ may be dispensed with.

The construction of this improved sight is simple, and is admirably adapted to fulfill the requirements of a rear wind gage sight. The head of the adjusting screw is here shown as an ordinary screw head, but any desired head may be employed, as for instance a folding head or handle such as that which forms the subject of United States Letters Patent No. 395,985, granted to me January 8, 1889.

The parts of the sight are not liable to get out of order or wear inordinately, the device is compact, and brought low down near the surface of the barrel, and springs are avoided for retaining the sights in position.

I claim as my invention—

1. In a wind gage sight, the combination of a base plate, a sliding head or part fitted to slide therein, a tube or sight ring mounted on the head, an adjusting screw journaled in the base plate and having its threaded portion engaged with the sliding head, the transverse screws inserted through the sight ring near the bottom thereof and in alignment, one of said screws being provided with a "teat" or pivotal bearing at its inner end, and the elbow or folding piece carrying the sights and journaled upon said "teat" between the ends of the screws, substantially in the manner and for the purpose specified.

2. In a wind gage sight the combination of a base plate adapted to be secured to the gun barrel, a sliding head or part fitted and adapted to horizontal movement in the base plate transversely to the axis of the barrel, said head being provided with a nut integral therewith, an adjusting screw journaled in the base plate and engaged with said nut, the transverse screws fitted in said head entering from opposite sides thereof and in alignment, a "teat" or pivotal bearing on one of the said screws, an elbow or folding piece journaled on said "teat" and clamped between the ends of the screws, and the sights carried on said folding piece and adapted to be thrown into or out of the field of vision, substantially as and for the purpose specified.

3. In a sight for firearms the combination of the base plate R, having the dovetailed part $a'$, the slot $b$, and the bearings $d$, the sliding head C, having the tube F mounted thereon and the nut block $c'$ integral with the head, the adjusting screw $e$ journaled in the base plate, in engagement with the nut block of the head C, and provided with the head and nut collar, the transverse screws $h$ fitted through the tube F near its junction with the head C and in alignment, one of said screws being provided with a "teat" or pivotal bearing and the other with a socket to receive said teat, the elbow or folding piece $i$ pivoted on said teat, and the sight carried on said folding piece, substantially as and for the purpose specified.

WILLIAM LYMAN.

Witnesses:
LYMAN A. MILLS,
ISADELL L. COOK.